March 27, 1928.

R. J. P. E. COZETTE 1,663,936

EXPLOSION ENGINE SUPERCHARGER

Filed Dec. 12, 1925

Inventor
R. J. P. E. Cozette
by Langner, Parry, Card & Langner
Attys.

Patented Mar. 27, 1928.

1,663,936

UNITED STATES PATENT OFFICE.

RENÉ JEAN PAUL EMILE COZETTE, OF NEUILLY-SUR-SEINE, FRANCE.

EXPLOSION-ENGINE SUPERCHARGER.

Application filed December 12, 1925, Serial No. 75,088, and in France December 29, 1924.

Figure 1:
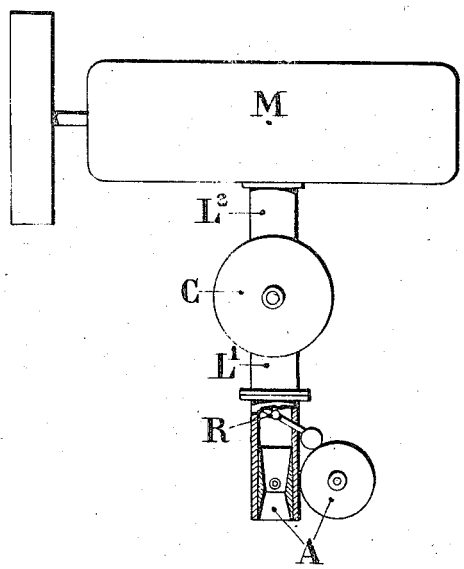
Figure 2:
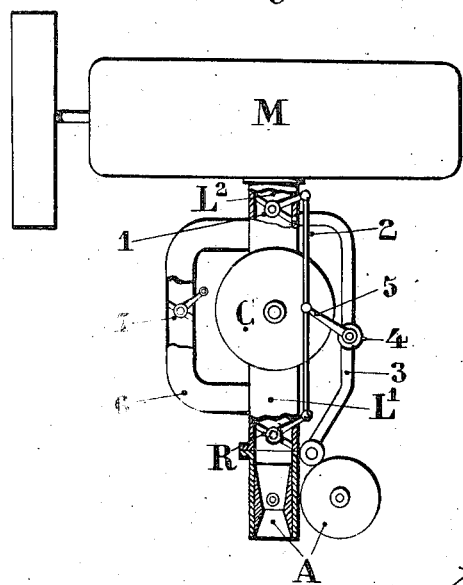

The devices in present use for supercharging an explosion engine by means of a compressor are known, the latter being placed between the carburetor and the engine. In the accompanying drawing, Figure 1 shows in an entirely diagrammatic manner, a plan view of the usual arrangement of supercharger. Fig. 2 is a similar view showing an arrangement according to the present invention. As shown in Figure 1, the compressor C is mounted upon the duct $L^1$, $L^2$ connecting the carburetor A to the engine M. In other words the carburetor A is connected to the suction port of the compressor C. In such an arrangement, the control of the power and speed of the engine is obtained by the displacement of the valve R controlling the carburetor.

This known arrangement gives rise to the two following objections:

1. It is difficult to obtain a good working at slow speed on account of the disturbing effect of the compressor, this effect showing itself in two ways.

(*a*) Petrol is condensed in the compressor when the engine is working at slow speed. An unsteady slow speed results and further, in the event of a back fire, there is a grave danger of an explosion occurring.

(*b*) On account of the position it occupies, beyond the controlling valve, the compressor is subjected to the action of the high vacuum existing in the admission ducts during working at slow speed. It is, under these conditions, very difficult to prevent an untimely entry of air along the shafts of the compressor and it is also difficult to prevent the suction of the oil which is necessary for the lubrication of the said compressor. This oil fouls the plugs of the engine and the lubrication of the compressor becomes defective.

2. In the event of the mechanical failure of the compressor or of its drive the engine comes unavoidably to a stop as a consequence. This stopping of the engine may have serious consequences, for instance in the case of aircraft engines.

This invention relates to improvements in devices of the above-mentioned type for removing the objectionable features described above.

Figure 2 in the accompanying drawing illustrates diagrammatically a form of construction of the improved device according to the invention.

As shown in this figure, the improved device is characterized by: the provision of two controlling valves (or butterfly valves) placed one between the carburetor and the compressor, the other between the compressor and the engine, these two valves being suitably conjugated in such a way that they act at the same time; by the provision of a special slow speed duct directly connecting the carburetor with the admission pipe of the engine, this duct opening into the said pipe in front of the compressor and being provided with a valve also integrally connected to the above mentioned controlling valves; finally, the provision of a duct mounted as a bye-pass and making the carburetor communicate directly with the engine, which arrangement enables the latter to work, even in the event of the failure of the compressor.

According to the invention (see Figure 2), the delivery duct $L^2$ of the compressor C is provided with a butterfly or controlling valve 1 connected, for example, by means of a link 2, to the usual butterfly or controlling valve R of the carburetor A. On account of the connection formed between these two valves, they open and close simultaneously.

The special slow speed duct 3 connects the carburetor to the duct $L^2$; this duct is similar to the one normally provided upon various types of carburetors, but instead of opening out at the level of the valve R of the carburetor it opens out beyond the compressor, in the duct $L^2$; according to an arrangement currently adopted the duct 3 opens out upon the face of the butterfly valve 1 or on the outside of a controlling valve (rotary or sliding plug) mounted in place of the butterfly valve 1 and serving the same purpose.

It will be noted that, with this arrangement the presence of the compressor has no effect upon the slow speed working; the disadvantages mentioned above are therefore removed in a very efficient manner.

It is obvious that as the controlling throttles 1 and R which are connected together by the link 2 open, the vacuum decreases in the delivery duct $L^2$; after a certain degree of opening has been reached the pressure becomes equal to and then greater than atmospheric pressure. When this result is obtained some of the explosive mixture may be driven into the duct 3. In order to obviate this disadvantage a cock 4 controlled by a lever 5 pivotally connected to the link 2 is provided upon the said duct; the cock 4 is controlled in such a way that the slow speed duct 3 is freely open when the throttle valves 1 and R are closed; inversely, the cock 4 closes the duct 3 when the power jet of the carburetor A is primed and it is sufficient to produce by itself the normal working of the engine, the duct 3 being closed in this way before the pressure in the duct $L^2$ has reached a valve greater than atmospheric pressure. It is seen that this arrangement has the effect of preventing any untimely delivery of the explosive mixture through the slow speed duct 3.

It is clearly understood that the invention is not limited to the particular form of construction which has been described and that, without altering the principle of it, the cock 4 may be directly controlled by one or the other of the throttle valves R and 1; the said cock 4 may also be directly mounted upon the pivot of one of the above mentioned butterfly valves. The cock 4 may be of any type, with a conical plug, needle, etc.

A valve casing device may also be provided automatically closing the duct in the event of a back fire or in the event of a delivery taking place due to the action of the compressor.

As mentioned above, the invention provides for a device adapted to enable the engine to continue working in the event of the failure of the compressor. For this purpose the device comprises a duct 6 mounted as a bye-pass upon the duct $L^1$, $L^2$ between the throttle valves R and 1. A cock, a controlling plug or a throttle 7 mounted at a suitable point upon the duct 6 enables the said duct 6 to put in or out of circuit as desired. When the compressor is working normally the cock 7 is closed and the device works as though the duct 6 did not exist.

In the event of a stoppage of the compressor it is sufficient to open the cock 7 for the duct $L^2$ to communicate freely with the duct $L^1$ which enables the engine to work in the usual manner, as if the compressor did not exist; in this case the engine draws directly into the carburetor.

What I claim is:

A supercharging device for an explosion engine, comprising a carburetor, a compressor placed between said carburetor and engine, a controlling valve member placed between said carburetor and said compressor, another controlling valve member placed between said compressor and the engine, said controlling valve members being suitably conjugated so that they act simultaneously, a slow speed duct directly connecting said carburetor to the admission pipe of the engine, said duct opening into said pipe beyond said compressor in the direction of flow, and being provided with a cock integrally connected to said controlling valve members.

In testimony whereof I have signed my name to this specification.

RENÉ JEAN PAUL EMILE COZETTE.